(12) United States Patent
Lescoche et al.

(10) Patent No.: US 10,369,745 B2
(45) Date of Patent: Aug. 6, 2019

(54) METHOD FOR MANUFACTURING FILTERING MEMBRANES BY ADDITIVE TECHNIQUE AND RESULTING MEMBRANES

(71) Applicant: TECHNOLOGIES AVANCEES ET MEMBRANES INDUSTRIELLES, Nyons (FR)

(72) Inventors: Philippe Lescoche, Piegon (FR); Jerome Anquetil, Sainte-Helene-Bondeville (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 233 days.

(21) Appl. No.: 14/892,445

(22) PCT Filed: Jun. 10, 2014

(86) PCT No.: PCT/FR2014/051383
§ 371 (c)(1),
(2) Date: Nov. 19, 2015

(87) PCT Pub. No.: WO2014/199062
PCT Pub. Date: Dec. 18, 2014

(65) Prior Publication Data
US 2016/0121271 A1    May 5, 2016

(30) Foreign Application Priority Data

Jun. 11, 2013   (FR) ...................... 13 55358

(51) Int. Cl.
*B29C 64/188*    (2017.01)
*B29C 64/165*    (2017.01)
(Continued)

(52) U.S. Cl.
CPC ........ *B29C 64/188* (2017.08); *B01D 46/2429* (2013.01); *B01D 63/066* (2013.01);
(Continued)

(58) Field of Classification Search
CPC ... B29C 64/188; B29C 64/112; B29C 64/153; B29C 64/165; B33Y 10/00
(Continued)

(56) References Cited

U.S. PATENT DOCUMENTS

| 4,863,538 A * | 9/1989 | Deckard | B22F 3/004 156/272.8 |
| 5,147,587 A * | 9/1992 | Marcus | B22F 3/004 156/272.4 |

(Continued)

FOREIGN PATENT DOCUMENTS

| DE | 102005048314 A1 | 4/2007 |
| JP | 2001-247374 | 9/2001 |

(Continued)

OTHER PUBLICATIONS

International Search Report dated Nov. 24, 2014, corresponding to International Application No. PCT/FR2014/051383.

*Primary Examiner* — Christopher D Rodee
(74) *Attorney, Agent, or Firm* — Ladas & Parry LLP; Malcolm J. MacDonald (57) ABSTRACT

The present invention relates to a membrane and a method for manufacturing a membrane for filtering a fluid, said membrane comprising: a substrate having a three-dimensional structure and consisting of an one-piece ceramic porous body; and at least one separating filtering layer having a porosity that is lower than that of the substrate, in which the three-dimensional structure of the substrate is produced by forming elemental layers that are stacked and connected in series with one another, by repeating steps: a)
(Continued)

depositing a continuous bed of powder at least partially consisting of a powder intended for forming the ceramic porous body; b) locally consolidating, part of the deposited material such as to create the elemental layer, and simultaneously linking the elemental layer thus formed with the preceding layer such as to gradually grow the desired three-dimensional shape.

19 Claims, 3 Drawing Sheets

(51) Int. Cl.
| | | |
|---|---|---|
| B29C 64/112 | (2017.01) | |
| B29C 64/153 | (2017.01) | |
| B01D 63/06 | (2006.01) | |
| B01D 67/00 | (2006.01) | |
| B01D 69/10 | (2006.01) | |
| B32B 3/12 | (2006.01) | |
| C04B 38/00 | (2006.01) | |
| B33Y 80/00 | (2015.01) | |
| B33Y 10/00 | (2015.01) | |
| B28B 1/00 | (2006.01) | |
| B01D 46/24 | (2006.01) | |
| B32B 7/02 | (2019.01) | |
| C04B 35/56 | (2006.01) | |
| C04B 35/58 | (2006.01) | |
| B01D 69/02 | (2006.01) | |
| B01D 71/02 | (2006.01) | |
| C04B 111/00 | (2006.01) | |

(52) U.S. Cl.
CPC ......... *B01D 67/0041* (2013.01); *B01D 69/02* (2013.01); *B01D 69/10* (2013.01); *B01D 71/02* (2013.01); *B01D 71/024* (2013.01); *B28B 1/001* (2013.01); *B29C 64/112* (2017.08); *B29C 64/153* (2017.08); *B29C 64/165* (2017.08); *B32B 3/12* (2013.01); *B32B 7/02* (2013.01); *B33Y 10/00* (2014.12); *B33Y 80/00* (2014.12); *C04B 35/56* (2013.01); *C04B 35/58* (2013.01); *C04B 38/0006* (2013.01); *B01D 2046/2437* (2013.01); *B01D 2325/02* (2013.01); *B32B 2307/726* (2013.01); *C04B 2111/00793* (2013.01)

(58) Field of Classification Search
USPC .......................................... 264/497
See application file for complete search history.

(56) References Cited

U.S. PATENT DOCUMENTS

| | | | |
|---|---|---|---|
| 6,767,499 B1* | 7/2004 | Hory .................... | B22F 3/1055 264/434 |
| 2005/0077226 A1* | 4/2005 | Bishop ................ | B01D 63/061 210/321.6 |
| 2011/0129640 A1* | 6/2011 | Beall ...................... | B28B 1/001 428/116 |
| 2012/0159938 A1 | 6/2012 | Fekety et al. | |
| 2012/0237745 A1* | 9/2012 | Dierkes ................ | A61K 6/0215 428/215 |
| 2013/0065073 A1* | 3/2013 | Fuwa .................. | C22C 33/0285 428/548 |
| 2013/0277891 A1* | 10/2013 | Teulet ................... | B22F 3/1055 264/497 |
| 2015/0285084 A1* | 10/2015 | Podgorski .............. | C04B 38/06 416/241 B |
| 2015/0321255 A1* | 11/2015 | Colin .................... | B22F 3/1055 419/55 |
| 2016/0103031 A1* | 4/2016 | Tham ..................... | B33Y 70/00 73/724 |
| 2016/0175929 A1* | 6/2016 | Colin ................ | C04B 35/62839 419/23 |

FOREIGN PATENT DOCUMENTS

| | | |
|---|---|---|
| WO | 2008146037 A1 | 12/2008 |
| WO | 2012032325 A1 | 3/2012 |

* cited by examiner

METHOD FOR MANUFACTURING FILTERING MEMBRANES BY ADDITIVE TECHNIQUE AND RESULTING MEMBRANES

This application is a 371 of PCT/FR2014/051383, filed on Jun. 10, 2014, which claims priority to French Application No. 1355358, filed Jun. 11, 2013.

The present invention relates to the technical field of the filtration elements commonly known as membranes. More specifically, the invention relates to a process for the manufacture of a membrane by an additive method and to a membrane capable of being obtained by such a process.

Separation processes using membranes are used in numerous sectors, in particular in the environmental sector for the production of drinking water and the treatment of industrial effluents, in the chemical industry, petrochemical industry, pharmaceutical industry and food processing industry and in the field of biotechnology.

A membrane constitutes a selective barrier and makes possible, under the action of transfer force, the passage or the halting of certain components of the medium to be treated. The passage or the halting of the components can result from their size with respect to the size of the pores of the membrane, which then behaves as a filter. Depending on the size of the pores, these techniques are called microfiltration, ultrafiltration or nanofiltration.

There exist membranes having different structures and textures. Membranes are generally composed of a porous support which ensures the mechanical strength of the membrane and also gives the shape and thus determines the filtering surface of the membrane. One or more layers with a thickness of a few microns, ensuring the separation and referred to as separating filtration layers, separating layers or active layers, are deposited on the support. During the separation, the transfer of the filtered fluid is carried out through the separating layer and then this fluid spreads through the porous texture of the support in order to be directed towards the exterior surface of the porous support. This portion of the fluid to be treated, which is passed through the separating layer and the porous support, is known as permeate and is recovered by a collecting chamber surrounding the membrane. The other portion is known as retentate and is generally re-injected into the fluid to be treated upstream of the membrane, by virtue of a circulation loop.

Conventionally, the support is first manufactured according to the desired shape by extrusion and then sintered at a temperature and for a time sufficient to ensure the required robustness, while retaining, in the ceramic obtained, the desired open and interconnected porous texture. This process forces straight channels to be obtained, inside which the separating filtration layer or layers are subsequently deposited and sintered. The membrane thus produced is therefore subjected to a minimum of two sintering operations. The organic binders added to the paste, before its extrusion, are completely incinerated during the sintering of the support.

Such a method is satisfactory but it is still desired to increase the profitability of the process and to limit as much as possible design defects.

In the context of the invention, a novel process for the manufacture of membranes is provided which makes it possible to obtain, with respect to the prior techniques, on the one hand, a gain in terms of reliability and production rate and, on the other hand, great variability with regard to the choice of the shapes of the support and of the channels inside the support.

In this context, the present invention relates to a process for the manufacture of a membrane for the filtration of a fluid, said membrane comprising:
- a support exhibiting a three-dimensional structure and being composed of a monolithic ceramic porous body, the mean diameter of the pores of which preferably belongs in the range extending from 4 µm to 40 µm, and
- at least one separating filtration layer deposited over a portion of the surface of the support, in which the three-dimensional structure of the support is produced by formation of superimposed individual sheets successively bonded to one another, by repetition of the following stages:
- a) deposition of a continuous powder bed composed at least in part of a powder intended to form the ceramic porous body, the bed being of unvarying thickness along a surface greater than the section of said porous body taken at the level of the sheet;
- b) localized consolidation, according to a predetermined pattern for each sheet, of a portion of the deposited substance in order to create the individual sheet and simultaneous bonding of the individual sheet thus formed to the preceding sheet, so as to bring about the progressive growth of the desired three-dimensional shape.

In other words, the process according to the invention comprises the repetition of the following stages:
- a) deposition of a homogeneous continuous bed of unvarying thickness of a powdered substance, this bed forming a layer covering a surface greater than the pattern of the section of the porous body which it is desired to form taken at the level of the sheet;
- b) localized consolidation of a portion of the powdered substance deposited according to a predetermined pattern for the sheet and simultaneous bonding of this newly consolidated substance to the pattern previously consolidated in the underlying sheet, so as to bring about the progressive growth, sheet after sheet, of the desired three-dimensional shape.

Once the three-dimensional structure has been formed, the nonconsolidated substance is removed.

In the context of the invention, stage b) is carried out in particular by an energy contribution or by spraying a liquid as fine droplets.

The localization of the consolidation is controlled in automated fashion. More specifically, the point of application of the energy contribution or of the spraying of liquid is computer controlled.

According to a first embodiment, the substance deposited is a mixture of a powder intended to form the porous body and of an activatable binder and the consolidation is carried out by localized spraying of an agent which activates the binder. The consolidation can then be carried out by localized spraying of this activating agent.

According to this first embodiment, the process comprises a stage of removal of the nonconsolidated substance and a final sintering stage after removal of the nonconsolidated substance.

In the context of the invention, which is in particular the case in the first embodiment, the separating filtration layer, which, by definition, has to have a smaller mean pore diameter than the support, can be created after formation of the porous body in order to create the surface intended to be in contact with the fluid to be treated.

According to a second embodiment, the consolidation is carried out by an energy contribution, in particular by laser, UV or electron beam treatment. The energy contribution can be varied, so as to obtain a mean pore diameter gradient within one and the same sheet and to thus simultaneously obtain the growth of the support and of the separating filtration layer. In this case, the formation of the separating layer and the formation of the support are both carried out by repeated implementation of stages a) and b).

In this second embodiment, generally, the substance deposited will be exclusively composed of a powder intended to form the porous body.

Whatever the embodiment employed, the deposited substance comprises, indeed is even exclusively composed of, a powder of inorganic substance which will constitute the final ceramic or of a powder of organic/inorganic or inorganic precursors which will constitute the final ceramic.

The porous body and the separating filtration layer are ceramic in nature and are generally composed of an oxide, of a nitride, of a carbide or of another ceramic material or of one of their mixtures, metal oxides, nitrides and carbides being preferred. In particular, the porous body and/or the separating filtration layer will be composed, indeed even exclusively composed, of titanium oxide, of alumina, of zirconia or of one of their mixtures, or also of titanium nitride, of aluminum nitride, of boron nitride or of silicon carbide, optionally as a mixture with another ceramic material.

When the separating filtration layer or layers and the porous support are both formed by the repetition of stages a) and b), they are necessarily made of one and the same material. In contrast, when the separating filtration layer or layers are deposited on the preformed porous body by a conventional deposition technique, they can be made of a different inorganic substance.

Advantageously, whatever the embodiment employed, the mean size of the grains of the powder deposited in stage a) is preferably from 2.4 to four times greater than the mean pore diameter which it is desired to obtain in the ceramic, the morphology and the distribution in sizes of the grains of the powder deposited having an influence on the mean pore diameter obtained.

Another subject matter of the present invention are the membranes obtained by the process defined in the context of the invention. Such membranes comprise:
- a support exhibiting a three-dimensional structure and being composed of a monolithic ceramic porous body, and
- at least one separating filtration layer deposited over a portion of the surface of the support.

The fact that the growth of the three-dimensional structure of the support has been carried out, in accordance with the invention, can be demonstrated by the visualization of different sheets by optical microscopy or scanning electron microscopy, which characterize the supports, indeed even the separating layers present in such membranes when the latter are also prepared by the additive technique. Of course, it may be desired for a demarcation between the different sheets to be as slight as possible.

In contrast to the processes for the preparation of the support by extrusion, proceeding continuously, which thus do not bring about any identifiable boundary in the texture of the material of the support in particular, the process defined in the context of the invention, proceeding by additive layers and thus not continuously, leaves a residual trace at the boundary between the sheets.

The description which will follow, with reference to the appended figures, makes possible a better understanding of the invention.

As a preliminary, a few definitions of the terms used in the context of the invention will be given.

Mean grain size is understood to mean the d50 value of a distribution by volume for which 50% of the total volume of the grains correspond to the volume of the grains with a diameter of less than this d50. The distribution by volume is the curve (analytical function) representing the frequencies of the volumes of the grains as a function of their diameter. The d50 corresponds to the median separating, into two equal parts, the area located under the curve of the frequencies, obtained by particle size determination by laser diffraction, which is the reference technique selected in the context of the invention for measuring the median grain diameter. Reference will be made in particular, for the technique for measuring the d50:
- to the standard ISO 13320:2009 as regards the technique for measuring by laser particle size determination,
- to the standard ISO 14488:2007 as regards the techniques for sampling the powder analyzed,
- to the standard ISO 14887:2000 as regards the reproducible dispersing of the powder sample in the liquid before the measurement by laser particle size determination.

Mean pore diameter is understood to mean the d50 value of a distribution by volume for which 50% of the total volume of the pores correspond to the volume of the pores with a diameter of less than this d50. The distribution by volume is the curve (analytical function) representing the frequencies of the volumes of the pores as a function of their diameter. The d50 corresponds to the median separating, into two equal parts, the area located under the curve of the frequencies which is obtained by mercury penetration for mean pore diameters of greater than or equal to 4 nm or by gas adsorption, and in particular $N_2$ adsorption, when the mean pore diameters are less than 4 nm, these two techniques being cited as references in the context of the invention for the measurement of the mean pore diameter.

In particular, use may be made of the techniques described in:
- the standard ISO 15901-1:2005 as regards the technique for measuring by mercury penetration,
- the standards ISO 15901-2:2006 and ISO 15901-3:2007 as regards the technique for measuring by gas adsorption.

The invention is targeted at the manufacture of filtration membranes by an additive technique. In such membranes, the body constituting the support exhibits a porous texture. This porous texture is characterized by the mean pore diameter deduced from their distribution measured by mercury penetration porosimetry.

The porous texture of the support is open and forms a network of interconnected pores, which allows the fluid filtered by the separating filtration layer to pass through the porous support and to be recovered at the periphery. It is normal to measure the permeability to water of the support in order to describe the hydraulic resistance of the support, which makes it possible at the same time to confirm the interconnection of the porous texture. This is because, in a porous medium, the stationary flow of a noncompressible viscous fluid is governed by Darcy's law. The velocity of the fluid is proportional to the gradient of the pressure and inversely proportional to the dynamic viscosity of the fluid, via a characteristic parameter known as permeability, which can be measured, for example, according to the French standard NF X 45-101 of December 1996.

In the context of the invention, the membranes for the tangential filtration of a fluid are more particularly targeted.

Such membranes comprise a porous support into which different circulation pathways for the fluid to be filtered are inserted. These circulation pathways exhibit an inlet and an outlet. Generally, the inlet of the circulation pathways is positioned in at least one inlet region for the fluid medium to be treated and their outlet in at least one outlet region for the retentate. The inlet region and the outlet region are connected by a continuous peripheral region where the porous support is solid and at which the permeate is recovered. The wall of the circulation passages is covered with at least one separating filtration layer which ensures the filtration of the fluid medium to be filtered.

Figure 1:
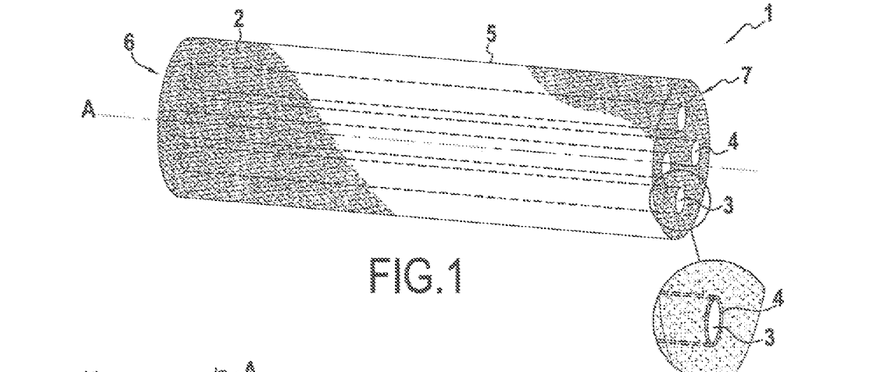
FIG. 1 shows a filtration membrane of tubular geometry into which a series of channels, corresponding to the circulation passages, have been inserted.

FIG. 1 illustrates an example of such a filtration membrane 1 of tubular geometry into which a series of channels, corresponding to the circulation passages, have been inserted, but many other forms might be constructed with the process according to the invention. According to this example, the filtration membrane 1 comprises a porous support 2 made in an elongated form extending along a central longitudinal axis A. The porous support 2 illustrated in FIG. 1 has a circular transverse cross section and thus exhibits a cylindrical exterior surface 5 but the transverse cross section might be any cross section or a polygonal cross section. The porous support 2 is arranged in order to comprise a series of channels which, in the example illustrated, number four channels 3 produced parallel to the axis A of the support. The channels 3 each exhibit a surface covered with at least one separating layer 4 intended to be in contact with the fluid medium to be treated circulating inside the channels 3. A portion of the fluid medium passes through the separating layer 4 and the porous support 2, so that this treated portion of the fluid, known as permeate, flows out through the exterior surface 5 of the porous support. The fluid to be filtered circulates between an inlet region and an outlet region. In the example illustrated, the inlet region 6 is located at one end of the tubular support and the outlet region 7 at the other end.

A filtration membrane generally exhibits a length of 1 meter to 1.5 meters. The section of a membrane generally exhibits a surface area of 0.8 cm$^2$ to 14 cm$^2$. The thicknesses of the separating filtration layers typically vary between 1 and 100 μm in thickness. Of course, in order to ensure its separating function and to act as active layer, the separating layer exhibits a mean pore diameter which is lower than the mean pore diameter of the support. Generally, the mean pore diameter of the separating filtration layer is at least lower by a factor of 3 and preferably by at least a factor of 5 with respect to that of the support.

The notions of separating microfiltration, ultrafiltration and nanofiltration layer are well known to the person skilled in the art. It is generally accepted that:
   separating microfiltration layers exhibit a mean pore diameter of between 0.1 and 2 μm,
   separating ultrafiltration layers exhibit a mean pore diameter of between 0.1 and 0.01 μm,
   separating nanofiltration layers exhibit a mean pore diameter of between 0.5 and 2 nm.

It is possible for this micro- or ultrafiltration layer to be deposited directly on the porous support (case of a monolayer separating layer) or also on an intermediate layer with a smaller mean pore diameter, itself deposited directly on the porous support (case of a monolayer separating layer). The separating layer can, for example, be based on or be composed exclusively of one or more oxide of a metal, carbide or nitride or other ceramics. In particular, the separating layer will be based on or be composed exclusively of $TiO_2$, $Al_2O_3$ and $ZrO_2$, alone or as a mixture.

In the context of the invention, the manufacture of the membrane is carried out by virtue of an additive technique. The support, indeed even the membrane in its entirety, is produced sheet after sheet. For this, upstream, by virtue of computer design software, the three-dimensional structure of the support or of the membrane to be produced is cut into slices. The virtual object in three dimensions to be produced is thus cut into two-dimensional slices of very fine thickness. These fine slices will then be produced one by one, in the form of sheets, by repeating the following binary sequence:
   the substance necessary to produce the porous support, indeed even also the separating filtration layer, when the two are composed of one and the same material, is deposited in the form of a powder as a continuous bed, then
   its agglomeration and its bonding to the surface on which it is deposited are carried out locally according to a predefined pattern by an energy contribution or by spraying a liquid as fine droplets.

The first stage of the binary sequence consists in depositing a continuous and homogeneous bed of powder of unvarying thickness according to a surface always greater than the section of said porous body taken at the individual sheet to be formed, this being done so as to guarantee the quality of finishing of the support obtained on the edges.

Once the substance has been consolidated according to the desired pattern at said individual sheet, the nonconsolidated excess substance will subsequently be removed during a final stage carried out after construction of the whole of the desired three-dimensional shape.

The support, indeed even the membrane in its entirety, is constructed by the superimposition of individual sheets bonded to one another by an energy contribution or by spraying a liquid as fine droplets. The localized energy contribution can be carried out with a directed light beam (LED or LASER) or a beam of directed electrons or also with any energy source allowing the focusing thereof and scanning of the bed of powder according to the pattern selected by CAD. The energy-substance interaction then results either in sintering, or in melting/solidification of the substance, or also in photopolymerization or photocrosslinking of the substance, according to its nature and that of the energy source used.

The localized contribution of liquid can be carried out with microdroplets created using a piezoelectric system, optionally charged and directed in an electrostatic field. The liquid will be a binder or an agent which activates the binder added beforehand to the ceramic powder.

Different additive techniques which can be used in the context of the invention for the design of the three-dimensional shape are described in detail below.

SLS (Selective Laser Sintering) or SLM (Selective Laser Melting)

In this case, a powder of the substance intended to constitute the support or the membrane, for example a powder of a ceramic material of the oxide, nitride or carbon type, indeed even a powder of one of its precursors, is deposited in order to form a continuous bed. The beam of a powerful laser is then applied locally according to the pattern selected and makes it possible to agglomerate the powder in order to form the sheet corresponding to the support or to the membrane and to bond it to the preceding sheet by sintering. Under the effect of the localized energy contribution, the grains of the powder partially melt and are fused to one another, which gives the cohesion thereof to the sheet, thus carrying out a pre-sintering of the shape being prepared. A further bed of powder is subsequently spread and the process resumes.

The beam of a laser scans the surface of the powder so as to consolidate the substance according to the desired pattern, sheet by sheet. This scanning can be carried out by displacing the laser along parallel trajectories. It can be advantageous for there to be overlapping of the impact surface of the laser between two successive parallel trajectories. The amount of energy received by the bed of powder at the point of the impact of the laser beam must be such that the melting of the powder grains remains partial or in all cases that each grain melts sufficiently to be bonded with its closest neighbors without closing the porous texture.

The settings of the machine will thus depend in particular on the intrinsic characteristics of the bed of powder and on the nature of the material determining the efficiency of the photons/substance interaction.

By way of indication, the conditions corresponding to the ranges presented in table 1 below can be used:

TABLE 1

|  | Min | Max |
| --- | --- | --- |
| Mean grain size of the ceramic powder | 10 μm | 100 μm |
| Thickness of the bed of powder | 40 μm | 200 μm |
| Power of the laser | 100 W | 1000 W |
| Rate of displacement of the laser | 0.5 m/s | 10 m/s |

By locally adjusting the focusing of the laser beam and/or the rate of displacement of the beam, it is possible to adjust the amount of energy received by the bed of powder and thus to adjust the densification of the ceramic material obtained and, for this reason, its porous texture. It is thus possible to obtain, at certain points, a porous texture corresponding to that desired for the separating filtration layer and, at others, that desired for the support.

Although the sintering is carried out as the design of the support or of the membrane goes along, by application of the laser, a final sintering stage can advantageously be carried out once the growth of the support or of the membrane is complete, in order to release the residual mechanical stresses and to homogenize the porous texture. The temperature chosen for such a final sintering will depend on the nature of the inorganic material used and on the mean grain size of the powder used; for example, a temperature of 1300° C. to 1500° C. will be used in the case of titanium oxide.

FIGS. 2A to 2F illustrate the succession of such a binary sequence for the preparation of a constituent support of the membrane presented in FIG. 1, in the case of the use of the SLS (or SLM) technique.

The axis of growth can be chosen without distinction. For example, in the case illustrated in FIGS. 2A to 2F, the growth is carried out parallel to the axis of the support but growth perpendicularly to its axis, or along any other direction, might also clearly be employed. In FIGS. 2A to 2F, the thicknesses of the beds and sheets are deliberately oversized in order to facilitate understanding.

Figure 2A:
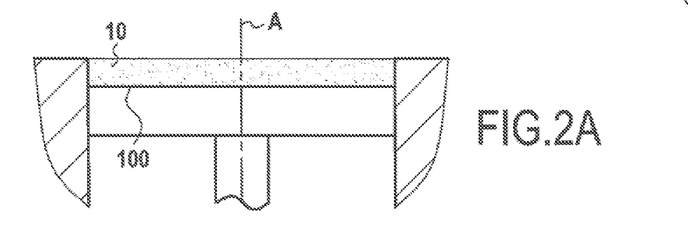
FIG. 2A shows a bed of powder deposited on a deposition surface.
Figure 2B:
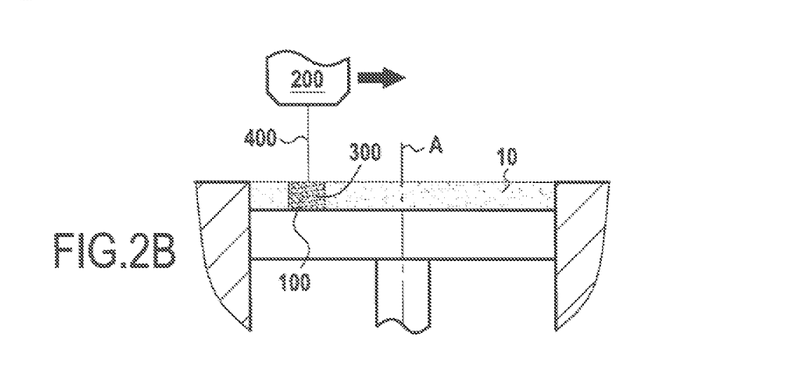
FIG. 2B shows the consolidation of the sheet initiated by the displacement of a laser displaced by virtue of an automatic displacement device.
Figure 2C:
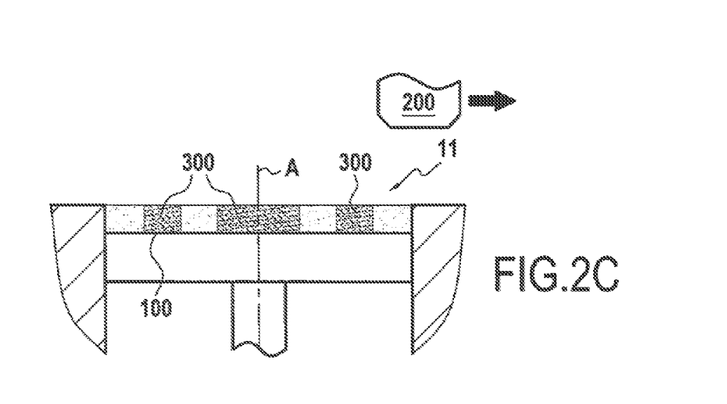
FIG. 2C shows the sheet consolidated according to the predetermined pattern.

In FIG. 2A, a bed of powder 10 is deposited on a deposition surface 100. FIG. 2B illustrates the consolidation of the sheet, which is initiated by the displacement of a laser 400 displaced by virtue of an automatic displacement device 200 which makes it possible to locally heat the powder over consolidation regions 300, making it possible to create the pattern 11. The sheet 11 consolidated according to the predetermined pattern is illustrated in FIG. 2C. In the example illustrated, the consolidation is carried out by means of a laser beam which is oriented locally over the regions to be consolidated. However, the technique would be employed similarly if a jet of liquid, in the form of microdroplets, were sprayed locally over the bed of powder according to the pattern selected.

Figure 2D:
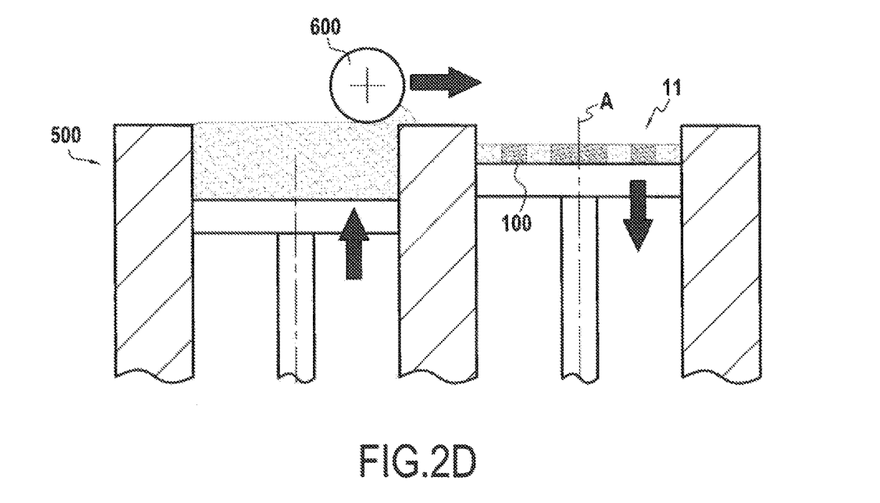
FIG. 2D shows a device that allows the deposition of a further bed of powder.

Subsequently, the deposition surface 100 is displaced vertically so as to be able to deposit a further bed of powder 20 on the consolidated sheet 11. The powder is introduced by any appropriate means. FIG. 2D illustrates an example of a device 500 which makes it possible to deposit a further bed of powder. The powder to be deposited is stored in a container placed beside the device in which the growth of the three-dimensional shape to be produced is carried out. In the example illustrated, a roller 600 or a scraper is displaced in order to introduce powder onto the preceding sheet 11. Such a roller 600 also makes it possible to spread, indeed even to compact, the powder, so as to form a continuous and homogeneous bed 20. As for the preceding sheet, the deposited bed extends along a surface greater than the section of the porous body to be produced taken at the sheet.

Figure 2E:
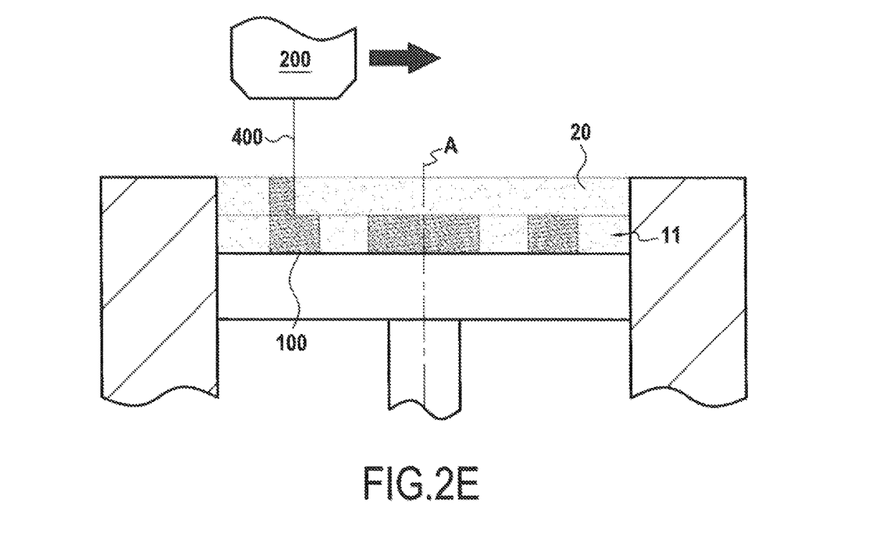
FIG. 2E shows the bed deposited on the sheet.
Figure 2F:
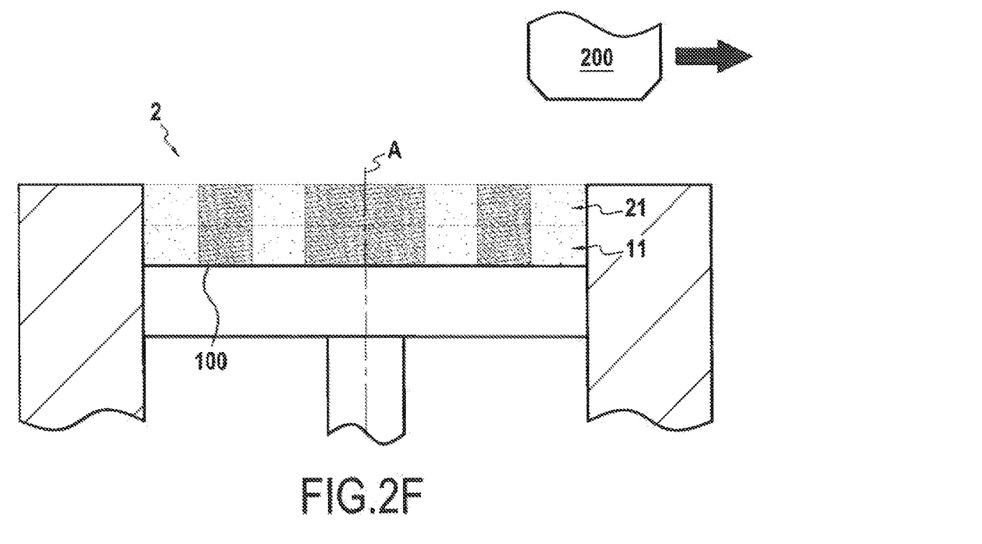
FIG. 2F shows two successive sheets obtained.

In FIG. 2E, it is apparent that the bed 20 is deposited on the sheet 11 and covers its entire surface. The operation of displacement of the laser 400 and its application according to the predetermined pattern are then carried out so as to obtain the consolidation of the following sheet 21 and its bonding to the preceding sheet 11. In the example illustrated, the growth of the support 2 is thus carried out along its longitudinal axis A. FIG. 2F shows the two successive sheets 11 and 21 obtained.

The example illustrated is fairly simple, so that the consolidation patterns corresponding to each of the sheets are identical. However, the technique offers the possibility of modifying the consolidation pattern as growth is carried out.

Figure 3:
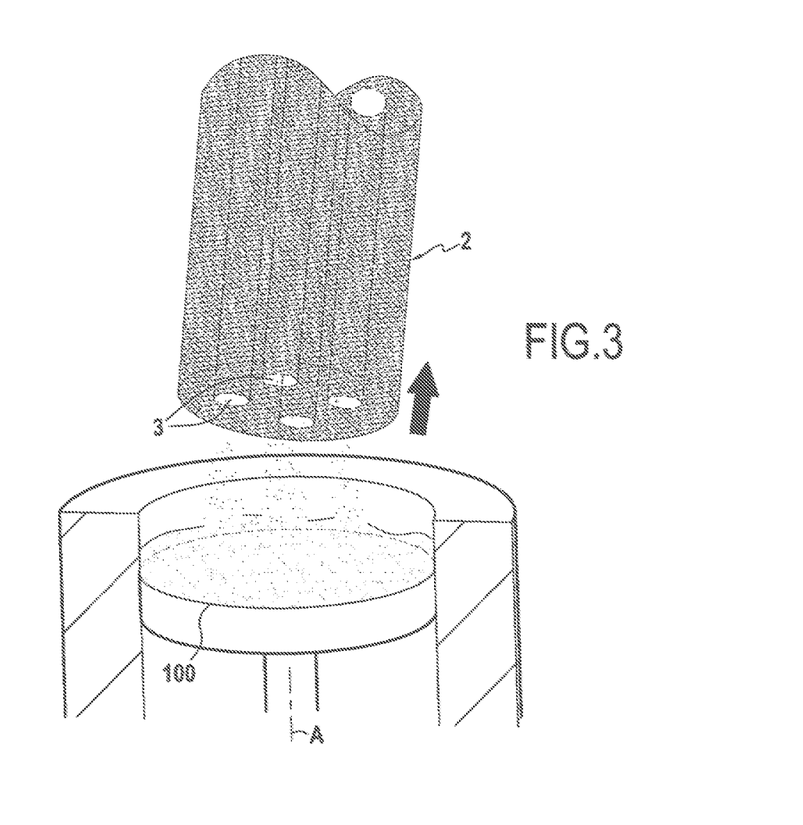
FIG. 3 shows the removal of the substance which has not been consolidated, to expose the desired three-dimensional shape.

Subsequently, the substance which has not been consolidated is removed, exposing the desired three-dimensional shape, for example by simply withdrawing it from the remaining powder and by taking off the residual powder present at the surface, as illustrated in FIG. 3. The powder which has not been consolidated can subsequently be reused, thus avoiding any loss of substance.

3D Printing

The principle remains the same but, in this case, the sheets deposited can correspond to a mixture of ceramic powder of the constituent substance of the support, indeed even of one of its precursors, with a binder itself in the form of a powder or coating the ceramic powder itself. Preferably, this mixture will be homogeneous and the powder particles of the constituent substance of the support, indeed even of one of its precursors, and those of the binder will exhibit similar sizes. Mention may be made, as examples of binders, of furan resins, phenolic resins and other aminoplasts. The percentage by weight of binder will be between 5 and 25%, according to its nature and the mean diameter of the powder used. Subsequently, an agent which activates the binder is sprayed in the form of very fine droplets according to the pattern selected and locally results in the agglomeration of the powder. The activating agent can be a solvent for the binder which, after virtually instantaneous drying, makes it possible to bond, by adhesion, the inorganic particles to one another or traps them inside a solid network.

It is also possible to deposit solely a ceramic powder of the substance intended to constitute the support, indeed even a powder of one of its precursors, in order to form a continuous bed and subsequently to locally spray a binder which will then be a rapid-drying liquid adhesive.

The spraying of binder or of activating agent which is in liquid form is carried out according to any appropriate device, in particular a piezoelectric system used in printers of the inkjet type. The process illustrated in FIGS. 2A to 2F remains the same, except that the device 400 is not a laser but a device which makes possible the spraying of binder or of activating agent.

After removing the nonagglomerated powder, the binder is removed during the sintering heat treatment, this binder removal generally being terminated before 500° C.

3D printing makes it possible, with mean grain sizes of the ceramic powder of between 30 and 100 µm, to produce thicknesses of the bed of powder of between 80 and 300 µm and to achieve rates of linear construction of the desired sheet of between 25 and 100 mm/hour.

LCM (Lithography-Based Ceramic Manufacturing)

LCM is a technique for which the ceramic powder is premixed with a photopolymerizable resin, the consolidation by polymerization being obtained with an LED or laser light source. As for the techniques described above, it is necessary to remove the noncrosslinked powder before the sintering heat cycle which makes possible the removal of binder, that is to say the removal of the photopolymerizable resin, and then the sintering proper. Here again, the process illustrated in FIGS. 2A to 2F remains the same, it being possible for the device 400 to be a laser or another light source of LED type.

The use of LCM is limited because the powder grains have to be transparent at the wavelengths under consideration for volume polymerization under and around the impact of light.

The process according to the invention has the advantage, with respect to the prior techniques, of providing the membranes with unvarying and uniform characteristics, of producing the support in a single production stage requiring neither tooling nor machining, and of making possible access to a broader range of shapes.

The thickness of the bed of powder and thus of each sheet successively consolidated is relatively low in order to make possible the bonding thereof to the lower sheet, for application of the energy contribution or spraying of the liquid. In particular, a thickness of 20 µm to 200 µm of powder will be deposited, this thickness depending on the additive technique selected.

It is the repetition of the binary sequence which makes it possible, sheet after sheet, to construct the desired three-dimensional shape. The consolidation pattern can vary from one sheet to the other. The growth of the desired three-dimensional shape is carried out along a chosen axis of growth.

The particle size distribution of the deposited powder is one of the factors which determines the minimum thickness of each bed of powder, and also the final mean pore diameter obtained. In particular, use will be made of a powder of the substance intended to form the support, for example a powder of metal oxide, indeed even a powder of one of its precursors. The powder deposited will exhibit, for example, a mean grain size of the order of 35 µm in order to obtain a mean pore diameter in the ceramic support of the order of 10 µm.

The applicant company has found that the adjusting of different parameters, such as the choice of the material and, for a given material, the mean grain size of the powder employed and, for a given material and a given grading, the thickness of the bed of powder, repeated layer after layer, on the one hand, and the adjusting of different parameters specific to the technology chosen for the consolidation makes it possible to obtain and to control an interconnected residual porous texture within the consolidated monolith. This residual porous texture is the result of a controlled sintering of the powder grains, leaving interconnected intergranular voids.

In the case of the use of an energy beam, the main parameters on which it is possible to act are its focusing, that is to say the diameter of the beam at the impact with the bed of powder, the rate of scanning of the bed of powder by the beam of photons or electrons or also the degree of overlap of the impact surfaces of the energy beam during the formation of a sheet.

In the case of the use of spraying of liquid, the main parameters on which it is possible to act are the weight of the drops, their frequency, the rate of scanning of the bed of powder by the jet of drops or also the degree of overlap during each pass.

The applicant company has also found that it is possible, by varying the different parameters described above, to adjust the distribution in size of the pores and, for each given population of pores, to control their number and their tortuousness.

Once the powder has agglomerated in the selected regions, the nonagglomerated substance is removed by any appropriate technique. The initial fluidity of the powder used facilitates this operation. It is also possible to use water jet techniques or vibrations in order to get rid of final traces of powder remaining at the surface of the shape produced.

The final consolidation of the filtering element and the final state of the porous texture are generally obtained by one or more heat post treatments which have as objective the removal of the binders (binder removal) and/or the sintering of the material proper. The temperature chosen for such a final sintering, carried out after removal of the excess nonagglomerated substance, will depend on the nature of the inorganic material used and on the mean grain size of the powder used.

In the case of 3D printing or LCM, the separating filtration layer or layers will be deposited once the support has been formed, after the final sintering operation. The deposition of a separating layer, in particular at the surface of the channels of the support, will consist in depositing, on the support, a suspension comprising at least one sinterable composition intended, after firing, to form a filtering layer. Such a composition exhibits a constitution conventionally used in the production of inorganic filtration membranes. This composition comprises at least one oxide, one nitride, one carbide or one other ceramic material or one of their mixtures, metal oxides, nitrides and carbides being preferred. The sinterable composition is suspended, for example in water. In order to eliminate the risk of the presence of aggregates and in order to optimize the dispersion of the grains in the liquid, the suspension obtained is milled in order to destroy the aggregates and to obtain a composition essentially composed of individual particles. The rheology of the suspension is subsequently adjusted with organic additives in order to satisfy the hydrodynamic requirements of penetration into the channels of the supports. Once deposited, the layer is dried and then sintered at a temperature which depends on its nature, on the mean size of its grains and on the cutoff threshold targeted.

In the case of SLS or SLM, the separating filtration layer or layers can be generated simultaneously with the growth of the support or else deposited subsequently according to the conventional deposition methods used in membrane production. Here again, the separating filtration layer or layers can be deposited from suspensions of particles of the inorganic substance to be deposited, or of one of its precursors. Such suspensions are conventionally used in the production of ceramic filtration elements. This or these layers are subjected, after drying, to a sintering operation which makes it possible to consolidate them and to bond them to the surface on which they are deposited. The particle size distribution of the particles present in the suspension will depend on the porous texture desired in the end for the separating filtration layer.

The examples below illustrate the invention but do not have any limiting nature.

Tubular membranes, of the type of that presented in FIG. 1, are manufactured in accordance with the invention. The support is provided in the form of a tube with a length of 300 mm to 1200 mm, the transverse cross section of which is circular and exhibits a diameter of 10 mm to 42 mm, and into which straight channels parallel to the axis of the tube are inserted.

EXAMPLE 1: SLS/SUPPORT ALONE

| Material | Titanium oxide |
| --- | --- |
| Mean grain size of the powder | 20-22 µm |
| Thickness of the bed of powder | 40 µm |
| Focusing (diameter of the laser beam at the point of impact with the powder) | 50 µm |
| Atmosphere of the chamber | Air |
| Power of the laser | 500 W |
| Rate of displacement of the laser | 2.5 m/s |
| % of overlap between two passes of the laser | 20-25% |
| Temperature of the final sintering | 1380° C. |
| Duration of the stationary phase at 1380° C. | 2 hours |
| Mean pore diameter obtained | 6-7 µm |

EXAMPLE 2: SLS/SUPPORT+LAYER

| Material | Titanium oxide | |
| --- | --- | --- |
| | Support | Separating layer |
| Mean grain size of the powder | 20-22 µm | |
| Thickness of the bed of powder | 40 µm | |
| Focusing (diameter of the laser beam at the point of impact with the powder) | 50 µm | |
| Atmosphere of the chamber | Air | |
| Power of the laser | 500 W | |
| Rate of displacement of the laser | 5 m/s | 1 m/s |
| % of overlap between two passes of the laser | 20-25% | |
| Temperature of the final sintering | | 1380° C. |
| Duration of the stationary phase at 1380° C. | | 2 hours |
| Mean pore diameter obtained | 6-7 µm | 1.4-1.5 µm |

EXAMPLE 3: SLS/SUPPORT ALONE

| Material | Silicon carbide |
| --- | --- |
| Mean grain size of the powder | 75-80 µm |
| Thickness of the bed of powder | 120 µm |
| Focusing (diameter of the laser beam at the point of impact with the powder) | 100 µm |
| Atmosphere of the chamber | Argon |
| Power of the laser | 500 W |
| Rate of displacement of the laser | 1.2 m/s |
| % of overlap between two passes of the laser | 30-35% |
| Mean pore diameter obtained | 25-30 µm |

In this case, no final sintering is necessary.

EXAMPLE 4: 3D PRINTING

| Material | Titanium oxide |
| --- | --- |
| Mean grain size of the powder | 35-40 µm |
| Thickness of the bed of powder | 80 µm |
| Type of binder | Furan resin |
| % of binder | 20% |
| Rate of linear construction of the shape | 30 mm/h |
| Temperature of the final sintering | 1500° C. |
| Duration of the stationary phase at 1500° C. | 6 hours |
| Mean pore diameter obtained | 10-12 µm |

In the case of examples 1, 3 and 4, the manufacture of the membrane is completed by the deposition of a separating layer at the surface of the channels which is produced starting from the following suspension.

Preparation of the Suspension by Milling in a Ball Mill

| Material | Titanium oxide |
| --- | --- |
| Mean grain size of the powder before milling | 3.6 µm |
| Titanium oxide/water ratio | 0.4 |
| Duration of the milling | 5 hours |
| Mean grain size of the powder after milling | 1 µm |
| Addition of water for adjusting the rheology | 200 to 400 centipoises |

A separating microfiltration layer having a cutoff threshold of 1.4 µm is obtained after a direct deposition on the support in the following way.

The suspension is pumped into the channels in order to be brought into contact with the surface of the channels. The driving mechanism of the deposition is the attraction of the liquid of the suspension by the porosity of the porous support.

The thickness of the deposition of titanium oxide particles at the surface and thus the weight deposited per unit of surface area depends on the residence time of the suspension in the channels of the support.

| Residence time of the suspension in the channels | 30 seconds |
|---|---|
| Weight deposited | 50 to 60 g/m² |

The operation is repeated twice for a final deposited weight of 110 g/m² approximately.

Firing Cycle for Sintering of the Layer

| Natural cooling | |
|---|---|
| Rate of rise in temperature up to 1200° C. | 100° C./hour |
| Duration of the stationary phase at 1200° C. | 1 hour |

The manufacture of microfiltration membranes with cut-off thresholds of less than 1.4 μm and ultrafiltration and nanofiltration membranes will be obtained by successive depositions on such a first layer starting from finer suspensions with appropriate thermal cycles.

The invention claimed is:

1. A process for the manufacture of a tangential filtration membrane comprising:
  a support exhibiting a three-dimensional structure and being composed of a monolithic ceramic porous body, with circulation pathways for the fluid to be filtered, said porous body exhibiting an open porous texture that forms a network of interconnected pores, said support exhibiting a mean pore diameter belonging to a range extending from 4 μm to 40 μm, and
  at least one separating filtration layer deposited over a wall of each of the circulation pathways,
  the process comprising:
  producing the three-dimensional structure of the support by an additive technique in which the three-dimensional structure of the support is cut into slices using a computer design software, wherein the slices are produced one by one in the form of superimposed individual sheets successively bonded to one another, by repetition of the following two stages:
  a) deposition of an homogeneous continuous bed of powdered substance of unvarying thickness intended to form the ceramic porous body along a surface greater than the pattern selected by CAD of the section of the porous body to form taken at the level of the sheet; and
  b) localized consolidation of a portion of the deposited powdered substance according to a predetermined pattern for each sheet, in order to create the individual sheet,
  wherein stages a) and b) are repeated so as to allow, at each repetition, a simultaneous bonding of the individual sheet thus formed to the preceding sheet, if present, so as to bring about the progressive growth of the desired three-dimensional shape comprising circulation pathways, with an open porous texture that forms a network of interconnected pores, and having a mean pore diameter in a range of from 4 μm to 40 μm,
  creating the separating filtration layer having a smaller mean pore diameter than the support:
  either by deposition after formation of the porous body in order to create the surface intended to be in contact with the fluid to be treated, such that the support and the separating filtration layer formed thereby are made of the same or different material,
  or created by the variation of the energy contribution so as to obtain a porosity gradient within one and the same sheet, such that the support and the separating filtration layer formed thereby are made of the same material.

2. The process as claimed in claim 1, wherein the mean pore diameter corresponds to the d50 value of the distribution by volume for which 50% of the total volume of the pores corresponds to the volume of the pores with a diameter of less than the d50 value; the distribution by volume being obtained by mercury penetration.

3. The process as claimed in claim 1, wherein, once the three-dimensional structure has been formed, the nonconsolidated powdered substance is removed.

4. The process as claimed in claim 1, wherein stage b) is carried out by an energy contribution, or by spraying a liquid as fine droplets.

5. The process as claimed in claim 1, wherein the consolidation is controlled in automated fashion.

6. The process as claimed in claim 1, wherein the powdered substance deposited is a mixture of a powder intended to form the porous body and of an activatable binder, and the consolidation is carried out by localized spraying of an agent which activates the binder.

7. The process as claimed in claim 6, comprising a stage of removal of the nonconsolidated powdered substance and a final sintering stage after removal of the nonconsolidated powdered substance.

8. The process as claimed in claim 1, wherein the consolidation is carried out by localized spraying of a binder.

9. The process as claimed in claim 1, wherein the consolidation is carried out by energy contribution.

10. The process as claimed in claim 9, wherein the energy contribution is varied, so as to obtain a porosity gradient within one and the same sheet.

11. The process as claimed in claim 9, wherein the consolidation is carried out by laser, UV, or electron beam treatment.

12. The process as claimed in claim 1, wherein the separating filtration layer is created after formation of the porous body in order to create the surface intended to be in contact with the fluid to be treated.

13. The process as claimed in claim 1, wherein the deposited powdered substance comprises a powder of inorganic substance which will constitute the ceramic porous body, or of a powder of organic/inorganic or inorganic precursors which will constitute the ceramic porous body.

14. The process as claimed in claim 13, wherein the deposited powdered substance consists of a powder of an inorganic substance which will constitute the ceramic porous body, or of a powder of organic/inorganic or inorganic precursors which will constitute the ceramic porous body.

15. The process as claimed in claim 1, wherein the porous body and the separating filtration layer are each composed of a ceramic.

16. The process as claimed in claim 15, wherein the porous body and the separating filtration layer are each composed of titanium oxide, of aluminum oxide, of zirconium oxide, or one of their mixtures, of titanium nitride, of aluminum nitride, of boron nitride, or of silicon carbide.

17. The process as claimed in claim 15, wherein the porous body and the separating filtration layer are each composed of titanium oxide, of aluminum oxide, of zirconium oxide, or one of their mixtures, of titanium nitride, of aluminum nitride, of boron nitride, or of silicon carbide, as a mixture with another ceramic material.

18. The process as claimed in claim 1, wherein the powdered substance deposited in stage a) is characterized by a mean grain size of between 10 and 100 μm.

19. The process as claimed in claim 18, wherein the mean grain size corresponds to the d50 value of the distribution by volume for which 50% of the total volume of the grains corresponds to the volume of the grains with a diameter of less than the d50 value, the distribution by volume being obtained by a particle size determination by laser diffraction.

* * * * *